United States Patent
Giroux et al.

(10) Patent No.: US 11,835,471 B2
(45) Date of Patent: Dec. 5, 2023

(54) Z-AXIS MEASUREMENT FIXTURE AND METHOD OF DETERMINING THE PLANARITY OF OBJECTS USING THE FIXTURE

(71) Applicant: IDEXX Laboratories, Inc., Westbrook, ME (US)

(72) Inventors: David C. Giroux, Gorham, ME (US); Nathanael Williams, Effingham, NH (US)

(73) Assignee: IDEXX Laboratories, Inc., Westbrook, ME (US)

( * ) Notice: Subject to any disclaimer, the term of this patent is extended or adjusted under 35 U.S.C. 154(b) by 51 days.

(21) Appl. No.: 17/490,461

(22) Filed: Sep. 30, 2021

(65) Prior Publication Data
US 2022/0099594 A1    Mar. 31, 2022

Related U.S. Application Data

(60) Provisional application No. 63/085,283, filed on Sep. 30, 2020.

(51) Int. Cl.
*G01N 21/956* (2006.01)
*G01N 35/00* (2006.01)

(52) U.S. Cl.
CPC ..... *G01N 21/956* (2013.01); *G01N 35/00623* (2013.01); *G01N 2035/00673* (2013.01)

(58) Field of Classification Search
CPC ........... G01N 21/956; G01N 35/00623; G01N 2035/00673; G01N 2035/00138; G01B 21/047; G01B 11/306
See application file for complete search history.

(56) References Cited

U.S. PATENT DOCUMENTS

| | | | |
|---|---|---|---|
| 4,870,668 A | 9/1989 | Frankel et al. | 378/34 |
| 6,886,264 B2 * | 5/2005 | Sakata | G01B 7/12 73/1.79 |

(Continued)

FOREIGN PATENT DOCUMENTS

WO    WO2018130573 A1    7/2018    ............. G02B 21/26

OTHER PUBLICATIONS

The Notification of Transmittal of the International Search Report and the Written Opinion of the International Searching Authority, or the Declaration, dated Jan. 20, 2022, which was issued by the International Searching Authority of WIPO in Applicantt's corresponding international PCT application having Serial No. PCT/US2021/052891, filed on Sep. 30, 2021.

(Continued)

*Primary Examiner* — Hung V Nguyen
(74) *Attorney, Agent, or Firm* — Bodner & Bodner, PLLC; Gerald T. Bodner; Christian P. Bodner

(57) ABSTRACT

A Z-axis measurement fixture used for testing whether a chemical reagent test slide exhibits Z-axis variability, which may affect measurements performed by an automated chemical analyzer using such test slides, includes a planar main body that holds three stainless steel balls, each ball having a known and calibrated diameter. Portions of the stainless steel balls extend outwardly from the top wall and the bottom wall of the planar main body. A chemical reagent test slide is placed on the fixture to rest on and be supported at three points by the portions of the stainless steel balls which project outwardly from the top wall of the planar main body. The fixture is placed on the surface of a gauge block of an optical measurement system such that the lower portions of the three stainless steel balls will rest on the gauge block of the optical measurement system.

18 Claims, 6 Drawing Sheets

(56) References Cited

U.S. PATENT DOCUMENTS

| | | | |
|---|---|---|---|
| 7,826,048 B2 | 11/2010 | Holecek et al. | 356/237.2 |
| 9,116,129 B2* | 8/2015 | Rich | G01N 21/78 |
| 9,823,109 B2* | 11/2017 | Garrepy | G01N 21/78 |
| 10,345,218 B2 | 7/2019 | Berezhna et al. | |
| 2010/0254854 A1 | 10/2010 | Rich et al. | 422/64 |
| 2015/0330776 A1 | 11/2015 | Hayashi et al. | 356/138 |
| 2016/0252713 A1 | 9/2016 | Corwin | 348/80 |

OTHER PUBLICATIONS

The Written Opinion of the International Searching Authority, dated Jan. 20, 2022, which was issued by the International Searching Authority of WIPO in Applicant's corresponding international PCT application having Serial No. PCT/US2021/052891, filed on Sep. 30, 2021.

The International Search Report, dated Jan. 20, 2022, which was issued by the International Searching Authority of WIPO in Applicant's corresponding international PCT application having Serial No. PCT/US2021/052891, filed on Sep. 30, 2021.

* cited by examiner

MSA 1
Using only the gauge block surface to position the part

POINT 7- Old jig

σe 0.02493  rICC 0.95616
σp 0.11642  Dr 6.67983
σt 0.11906  σe %total 4.38403

Measurement Discrimination is NOT Adequate

MSA 2
Using the three gauge ball fixture to position the part

POINT 7- 3 ball jig

σe 0.00773   rICC       0.98153
σp 0.05634   Dr         10.3564
σt 0.05687   σe %total  1.84749

Measurement Discrimination is Adequate ent instrument"), for example, an optical measurement instrument, such as the Micro-Vu™ analyzer manufactured by Micro-Vu Corporation of Windsor, California. However, conventional fixtures used in such quality control tests, which fixtures are often made from a plastic material, may themselves have imperfections in their overall thicknesses and lack planar consistency over all areas thereof such that the holding fixture may contribute to inaccurate Z-axis measurements in quality control tests performed on the slides. Slides are also placed to rest directly on the gauge block of the optical measurement, but it has been found that in some instances the slides do not rest evenly on the gauge block, the result of which is inaccurate quality control measurements.

Z-AXIS MEASUREMENT FIXTURE AND METHOD OF DETERMINING THE PLANARITY OF OBJECTS USING THE FIXTURE

CROSS-REFERENCE TO RELATED APPLICATIONS

This application is related to U.S. Provisional Patent Application Ser. No. 63/085,283, filed on Sep. 30, 2020, and titled "Z-Axis Measurement Fixture And Method Of Determining The Planarity Of Objects Using The Fixture", the disclosure of which is hereby incorporated by reference and on which priority is hereby claimed.

BACKGROUND

Technical Field

The present disclosure is directed to fixtures used in calibration and quality control measurements of planar objects to check for Z-axis variability or imperfections in the surface topography of such objects, and more particularly relates to quality control measurements performed on chemical reagent test slides used by automated chemical analyzers.

Background

In reflectometry, absorbance and fluorescence measurements of dry chemistry reagent test slides performed by an automated chemical analyzer such as the VetTest® analyzer, the Catalyst Dx® analyzer and the Catalyst One® analyzer (each of which is manufactured and/or distributed by IDEXX Laboratories, Inc. of Westbrook, Maine) and Vitros® analyzers (available from Ortho Clinical Diagnostics of Raritan, New Jersey), it is important that the test slides used in such measurements performed by the analyzers are not warped during manufacture, storage or inappropriate handling such that they vary in thickness, exhibit imperfections in their surfaces or are not entirely planar over all portions thereof. Indeed, Z-axis variability in the test slides, or irregularities in the surface topography of such slides, especially over critical portions thereof where measurements are taken, will have a deleterious effect on the accuracy of such measurements.

OBJECTS AND SUMMARY

Some analyzers include a rotating carousel having slots in which the reagent test slides are respectively received. Loading the test slides on the carousel is performed in an automated process by the analyzer. If a test slide is warped, it may not be properly received in its respective slot on the carousel, causing the carousel to jam and requiring the clinician to clear the jam, resulting in down time and possible the loss of a test run.

In accordance with good quality control practices, IDEXX Laboratories, Inc. continually performs tests on such slides to ensure that, lot-to-lot, such slides consistently reside in a single X-Y plane (within acceptable tolerances) and do not manifest any Z-axis variability that may affect measurements performed using such slides or affect the operation and performance of the instrument in which such slides are used.

To perform such quality control tests on the slides to check for Z-axis variability, a jig or fixture can be used to hold the slide in place to rest on a gauge block of a measurement system (also referred to herein as a "measurement instrument"), for example, an optical measurement instrument, such as the Micro-Vu™ analyzer manufactured by Micro-Vu Corporation of Windsor, California. However, conventional fixtures used in such quality control tests, which fixtures are often made from a plastic material, may themselves have imperfections in their overall thicknesses and lack planar consistency over all areas thereof such that the holding fixture may contribute to inaccurate Z-axis measurements in quality control tests performed on the slides. Slides are also placed to rest directly on the gauge block of the optical measurement, but it has been found that in some instances the slides do not rest evenly on the gauge block, the result of which is inaccurate quality control measurements.

More generally, when testing a planar object to accurately measure Z-axis variability or irregularities in the surface of the object, whether the objects are chemical reagent test slides, as mentioned previously, or semiconductor wafers, cast products and consumable test products having critical flatness requirements, sheet metal products or the like, it is essential to establish datum points. Furthermore, parts that are free form or have irregular shapes are next to impossible to establish such datum points when held in a conventional test fixture for optically or visually performed quality control tests.

It is an object of the present disclosure to provide a fixture for holding a planar object so that accurate tests may be performed to check the planar object for Z-axis variability or surface irregularities.

It is another object of the present disclosure to provide a fixture for holding a planar object in a precise position in an optical measurement system used in optically testing the planar object for Z-axis variability or surface irregularities.

It is still another object of the present disclosure to provide a fixture used in quality control tests performed on a planar object held thereby and having a free form or irregular shape.

It is a further object of the present disclosure to provide a fixture for holding a chemical reagent test slide to check the slide for Z-axis variability or surface irregularities that may affect measurements performed by an automated chemical analyzer using such a reagent test slide.

It is yet a further object of the present disclosure to provide a fixture for holding a planar object for quality control tests performed on the planar object which overcomes the inherit disadvantages of conventional fixtures which, when used to hold a planar object, may lead to inaccurate measurements obtained during such quality control tests.

It is still a further object of the present disclosure to provide a method of determining the planarity of an object using a Z-axis measurement fixture on which the object may be mounted.

It is another object of the present disclosure to provide a method for testing whether a planar object exhibits Z-axis variability or surface topography irregularities.

In accordance with one form of the present disclosure, a Z-axis measurement fixture used for testing whether a planar object exhibits Z-axis variability or surface topography irregularities includes a planar main body, or spacer, and a plurality of object supporting members. The planar main body has a top wall and a bottom wall disposed opposite the top wall. The planar main body has formed through the thickness thereof a plurality of member receiving openings extending between the top wall and the bottom wall.

Each of the object supporting members has a known and calibrated dimension in at least one coordinate direction, and each object supporting member is received by a respective member receiving opening formed in the planar main body. In one form, each object supporting member may be spherical in shape, and may be a stainless steel ball having a known and calibrated diameter.

Each object supporting member has a first portion which projects outwardly from the top wall of the planar main body, and a second portion which projects outwardly from or is at least level with the bottom wall of the planar main body. Each object supporting member is arranged within its respective member receiving opening such that the first portion thereof projecting outwardly from the top wall of the planar main body and the second portion thereof projecting outwardly from or being level with the bottom wall of the planar main body are in alignment with the known and calibrated dimension of the object supporting member in the at least one coordinate direction. The first portion of each object supporting member projecting outwardly from the top wall of the planar main body is adapted to contact and support a portion of the planar object, and the second portion of each object supporting member projecting outwardly from or being level with the bottom wall of the planar main body is adapted to contact and rests on a surface of a gauge block of an optical measurement system.

Having the planar object to be tested for quality control and Z-axis variability supported directly by the object supporting members having a known and calibrated dimension, and the object supporting members resting on the surface of the gauge block of an optical measurement system, ensures that the planar object, whether it is a chemical reagent test slide, sheet metal or a semiconductor wafer or the like, is supported above the gauge block of an optical measurement system by a precise and calibrated distance so that the fixture itself will not cause any inaccurate optical or visual measurements of Z-axis variability or surface irregularities obtained during quality control tests.

These and other objects, features and advantages of the present disclosure will be apparent from the following detailed description of illustrative embodiments thereof, which is to be read in connection with the accompanying drawings.

DETAILED DESCRIPTION OF THE PREFERRED EMBODIMENTS

Z-axis variability or lack of flatness in planar objects 2 (FIG. 1A) may affect the quality of the object 2 (FIG. 1A) or the accuracy of measurements taken using such planar objects 2 when planarity or flatness is a critical feature. For example, with respect to chemistry slides 4 (FIG. 1A), flatness and outer dimensions are important features when such slides 4 are used in chemistry analyzers. Flatness is also critical in microtiter plates and other consumable products that are used in and function with other test instruments. Certain sheet metal parts are required to be flat with minimal surface irregularities or imperfections so that they may properly align with other components in the final assembly of a product. Post processing of semiconductor wafers stringently requires flatness in the wafers. Cast products may further have critical flatness requirements. The Z-axis measurement fixture 6 of the present disclosure, as will be described in greater detail herein, may be used to verify the flatness and planarity of such objects 2 (FIG. 1A).

Figure 1:
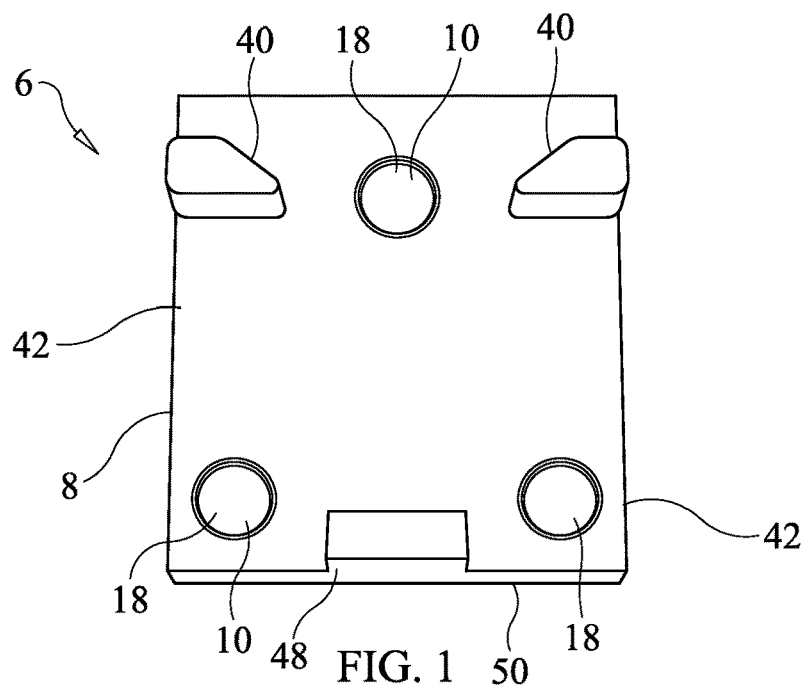
FIG. 1 is a top plan view of one form of a Z-axis measurement fixture formed in accordance with the present disclosure, and structured for holding trapezoidially-shaped chemical reagent test slides thereon for quality control testing.
Figure 1A:
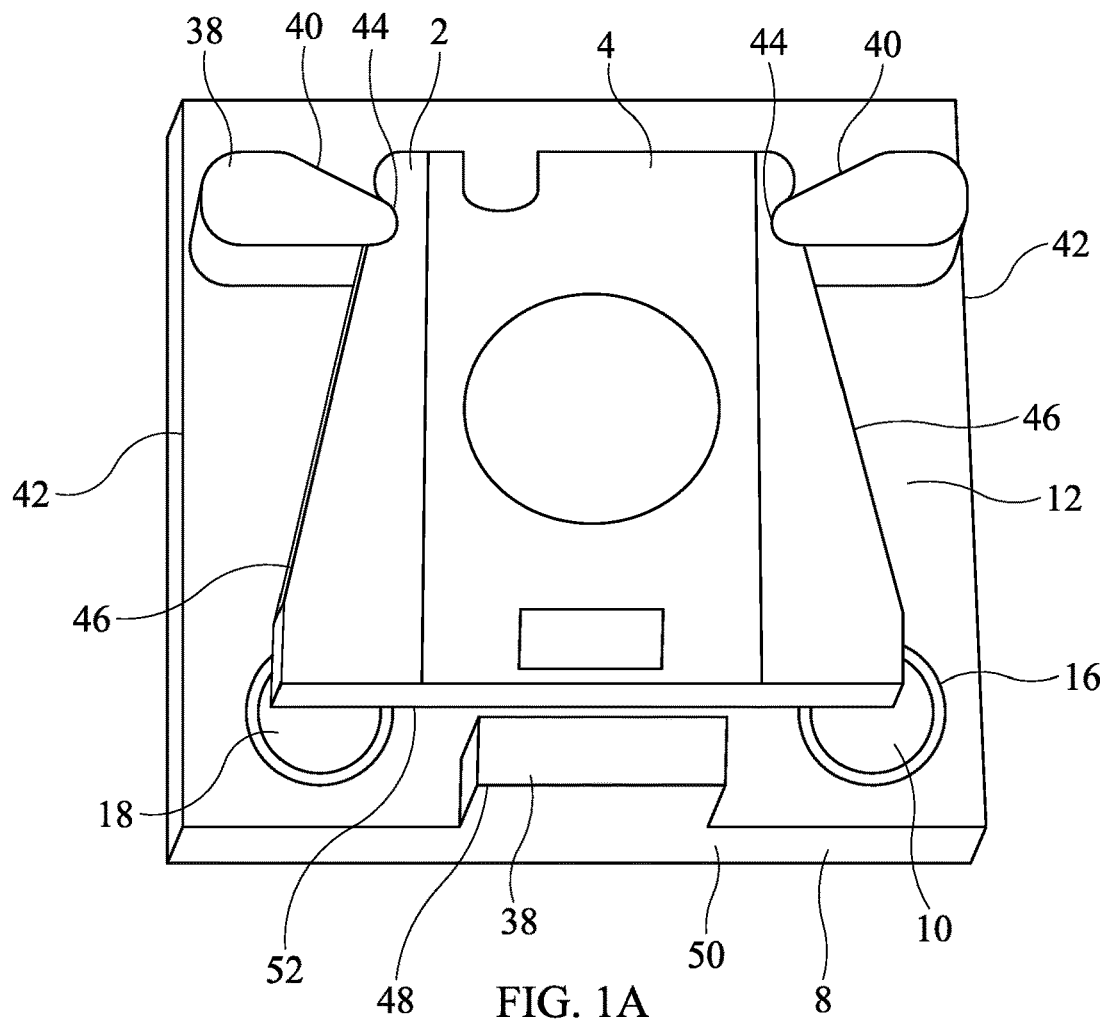
FIG. 1A is a top plan view of the Z-axis measurement fixture shown in FIG. 1, and showing a trapezoidially-shaped chemical reagent test slide mounted thereon.

FIG. 1 illustrates one form of the Z-axis measurement fixture 6 of the present disclosure. This fixture 6 is particularly designed to test for Z-axis variability in trapezoidially-shaped chemical reagent test slides 4, such as the slide 4 shown mounted on the fixture 6 in FIG. 1A, that are used by chemical analyzers and other instruments manufactured and/or distributed by IDEXX Laboratories, Inc. Fixture 6 can also be used to test for Z-axis variability in generally rectangular-shaped chemical reagent test slides, such as those used in the Vitros® and VetTest® analyzers. However, the use of the measurement fixture 6 of the present disclosure is not limited to the testing of such chemical reagent test slides 4, and is applicable for testing many different forms of planar objects 2 including free form or irregularly-shaped planar objects 2.

With reference to FIG. 1, the exemplary Z-axis measurement fixture 6 shown therein includes a planar main body 8, and a plurality of object supporting members 10. The planar main body 8 has a top wall 12 and a bottom wall 14 (FIG. 3) that is disposed opposite the top wall 12. The planar main body 8 defines a plurality of member receiving openings 16 extending between the top wall 12 and the bottom wall 14.

The planar main body 8 may take on many different shapes to accommodate planar objects 2 of different sizes and shapes, including free form or irregular shapes. Furthermore, another advantage of the fixture 6 of the present disclosure is that the planar main body 8 may be easily and cost-effectively fabricated from a plastic or thermoplastic material on a 3D printer or by injection molding. 3D printing or injection molding the fixture 6 may introduce irregularities in the surfaces of the main body 8 of the fixture 6. As will become evident from the following description of the fixture 6, such irregularities in the surfaces of the main body 8 will not affect quality control tests performed on a planar object 2, such as a chemical reagent test slide 4, supported by and mounted on the fixture 6 of the present disclosure to check for Z-axis variability in the planar object 2. This is because the planar object 2 does not rest directly on the planar main body 8 of the fixture 6, as will be described below.

As mentioned above, the Z-axis measurement fixture 6 of the present disclosure includes a plurality of object supporting members 10. Each object supporting member 10 has a known and calibrated dimension in at least one coordinate direction. For example, the object supporting members 10 may be spherical objects or stainless steel balls 18 having a known and calibrated diameter. However, such object supporting members 10 may take on other shapes, such as cylindrical posts or rods having an axial length or radius that is known and calibrated, egg-shaped or oval supports, or pyramid or conically-shaped structures, each of which has a known and calibrated dimension in at least one coordinate direction (for example, from the base of the cone or pyramid to the apex thereof).

Each object supporting member 10, whether it is a stainless steel ball 18, a rod-shaped support, or another structure having a calibrated dimension, is received by and retained in a respective member receiving opening 16 formed in the planar main body 8 of the fixture 6. More particularly, each object supporting member 10 has a first portion 20 which projects outwardly from the top wall 12 of the planar main body 8, and a second portion 22 which projects outwardly from or is at least level with the bottom wall 14 of the planar main body 8. Even more particularly, each object supporting member 10 is arranged within its respective member receiving opening 16 such that the first portion 20 thereof projecting outwardly from the top wall 12 of the planar main body 8 and the second portion 22 thereof projecting outwardly from or being level with the bottom wall 14 of the planar main body 8 are in alignment with the known and calibrated dimension of the object supporting member 10 in the at least one coordinate direction. For example, a stainless steel ball 18 will have a known and calibrated dimension in any radial direction. If a rod or post is used as the object supporting member 10, where the axial length of the rod or post is known and calibrated, a portion of one axial end of the rod or post will extend outwardly from the top wall 12 of the planar main body 8 of the fixture 6, and a portion of the opposite axial end of the rod or post will extend outwardly from or be level with the bottom wall 14 of the planar main body 8. Or, if the diameter of the rod or post is known and calibrated, the rod or post may be placed sideways in a respective member receiving opening 16 such that diametrically opposite portions of the cylindrical surfaces of the rod or post project outwardly from the top wall 12 and project outwardly or are level with the bottom wall 14 of the planar main body 8.

In one form of the fixture 6 of the present disclosure, the planar main body 8 holds the object supporting members 10 captive within their respective member receiving openings 16 in an immobile or mobile state. In some embodiments, the object supporting members 10 are movable within their member receiving openings 16 in a transverse direction through the thickness of the planar main body 8, that is, between the top wall 12 and the bottom wall 14 thereof. In some embodiments, the dimensions of the member receiving openings 16 may be selected so that the object supporting members 10 received thereby are removable therefrom from either the top wall 12 or the bottom wall 14 of the planar main body 8, or may "float" within their respective member receiving openings 16 and not be constrained in movement in the transverse direction by the planar main body 8 of the fixture 6.

Figure 3:
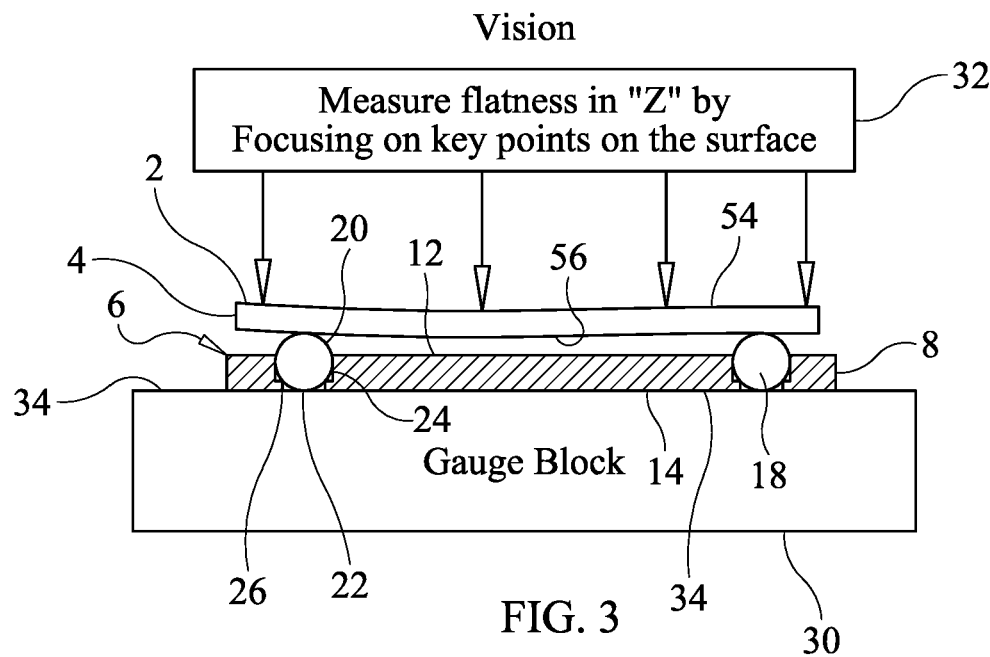
FIG. 3 is a diagrammatic side view of the fixture shown in FIGS. 1 and 2 supporting a chemical reagent test slide and being shown mounted on a gauge block of an optical measurement system.

For example, and as shown in FIG. 3 of the drawings, the member receiving openings 16 extending between the top wall 12 and the bottom wall 14 of the planar main body 8 may be generally cylindrical in shape and, preferably, have a relatively larger diameter upper portion 24 in proximity to the top wall 12 that extends into the thickness of the planar main body 8, and a smaller diameter lower portion 26 (relative to the diameter of the upper portion 24) in proximity to the bottom wall 14 and which extends partially into the thickness of the planar main body 8. In this embodiment of the fixture 6, the inside diameters of the upper portions 24 of the member receiving openings 16 are chosen to be slightly greater than the lateral width or diameter of the object supporting members 10 (for example, the stainless steel balls 18 shown in FIG. 3) such that the object supporting members 10 may be received by and are movable in the upper portions 24 of the member receiving openings 16. The inside diameters of the lower portions 26 of the member receiving openings 16 are chosen so that the second portions 22 of the object supporting members 10 may project outwardly from or are at least level with the bottom wall 14 of the planar main body 8, as shown in FIG. 3 of the drawings.

Figure 2:
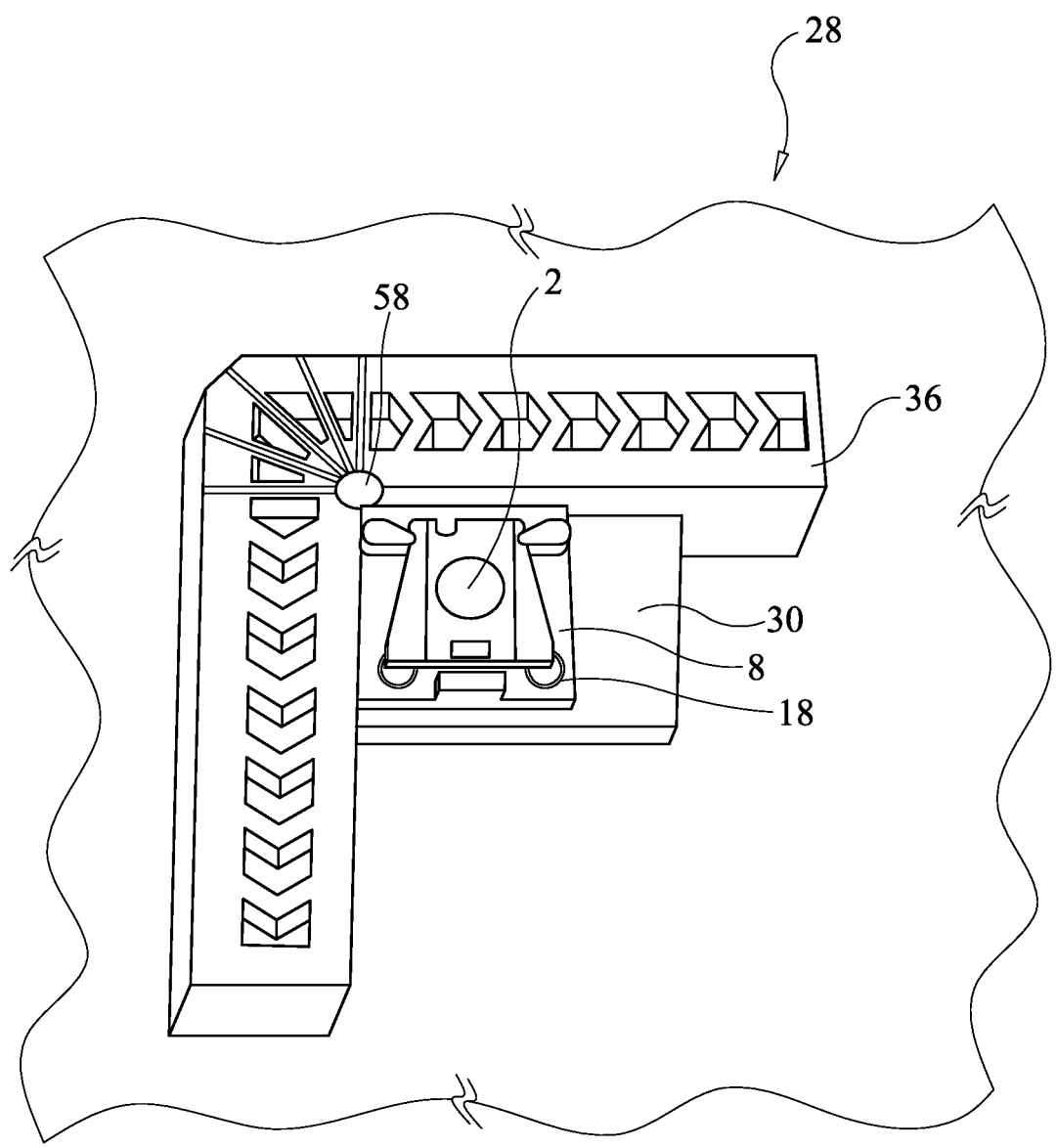
FIG. 2 is a top perspective view of the Z-axis measurement fixture shown in FIG. 1 having a chemical reagent test slide mounted thereon and positioned for testing in an optical measurement system.
Figure 4:
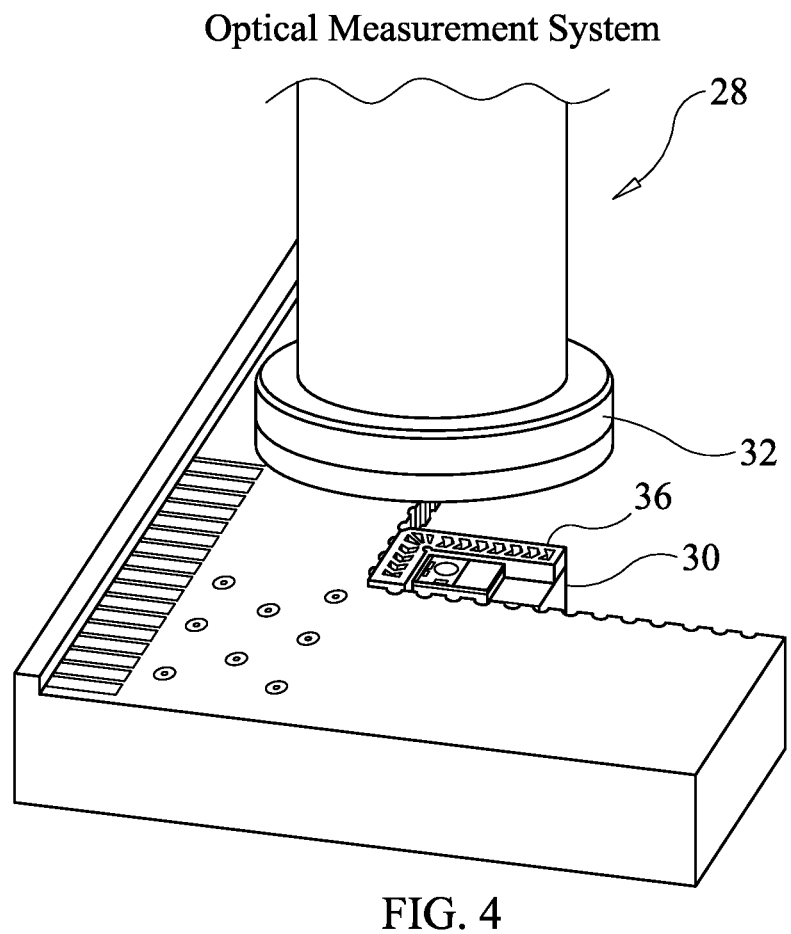
FIG. 4 is another perspective view of the fixture shown in FIGS. 1-3 having a chemical reagent test slide mounted thereon and being positioned under a camera of an optical measurement system for quality control testing.

FIGS. 2-4 show how the Z-axis measurement fixture 6 of the present disclosure may be used in conjunction with an optical measurement system 28 for checking Z-axis variability in a planar object 2, in this example, a trapezoidially-shaped chemical reagent test slide 4. The optical measurement system 28 includes a gauge block 30 which is positioned underneath a viewing camera 32. The gauge block 30 has a known flat surface 34. The planar object 2 to be measured for Z-axis variability is mounted on the fixture 6, and the fixture 6 is placed on the calibrated surface 34 of the gauge block 30 of the optical measurement system 28 and positioned in the corner of a right angle form 36 used with the optical measurement system 28. The second portions 22 of the object supporting members 10 contact and rest on the surface 34 of the gauge block 30. The planar object 2 to be tested for Z-axis variability rests in contact with and is supported by the first portions 20 of the object supporting members 10. Thus, the planar main body 8 of the fixture 6 holds the object supporting members 10, be they spherical balls, rods or some other structure, in an X/Y plane but allows the object supporting members 10 to freely contact the planar object 2 and the known flat surface 34 of the gauge block 30. Thus, the use of calibrated object supporting members 10, such as stainless steel balls 18, eliminates the requirement for tight tolerances on the planar main body 8 of the fixture 6 and allows the main body 8 to be custom printed for a particular application, that is, to support planar objects 2 of different shapes, such as, for example, trapezoidially-shaped chemical reagent test slides 4, or free form or irregularly-shaped objects 2. The use of such object supporting members 10, providing a known and calibrated "Z" distance from the flat surface 34 of the gauge block 30 of the optical measurement system 28, results in more accurate measurements of Z-axis variability in the planar object 2 being tested and enables the planar object 2 to be positioned in space by consistently contacting a plurality of target datums on the planar object 2 (such as three points on the chemical reagent test slide 4 when three calibrated stainless steel balls 18 are used).

One method of measuring Z-axis variability in a planar object 2, in this particular example, a chemical reagent test slide 4, will now be described. A measurement fixture 6 formed in accordance with the present disclosure and including features described herein is placed on the surface 34 of a gauge block 30 of an optical measurement instrument 28, such as the Micro-Vu™ instrument mentioned previously, and under the camera 32 of the optical measurement instrument 28, and is aligned in an X-Y plane on the gauge block 30 by placing the fixture 6 against the right angle form 36. The object supporting members 10, which preferably are three spaced apart, calibrated stainless steel balls 18, are held in place in an X-Y plane by the main body 8 of the fixture 6 but are allowed free contact with the surface 34 of the gauge block 30 of the optical measurement instrument 28.

A chemical reagent test slide 4 is mounted on the fixture 6 and held in place thereon by object edge guide projections 38 and wedge projections 40 situated on the main body 8 of the fixture 6, as will be described in greater detail. The test slide bottom surface 56 contacts the three calibrated balls 18 of the fixture 6 and is oriented in the Z-axis to the plane made by the three points of contact with the calibrated balls 18.

Optical measurements of the slide 4 are taken by the optical measurement instrument 28 by establishing a zero reference plane from the focal point of the camera 32 at a selected point or area on the top surface 54 of the slide 4, the camera 32 preferably being adjusted to have a predetermined field of view and/or a predetermined focal plane in establishing the zero reference plane at the desired point or area on the slide 4.

Figure 5:
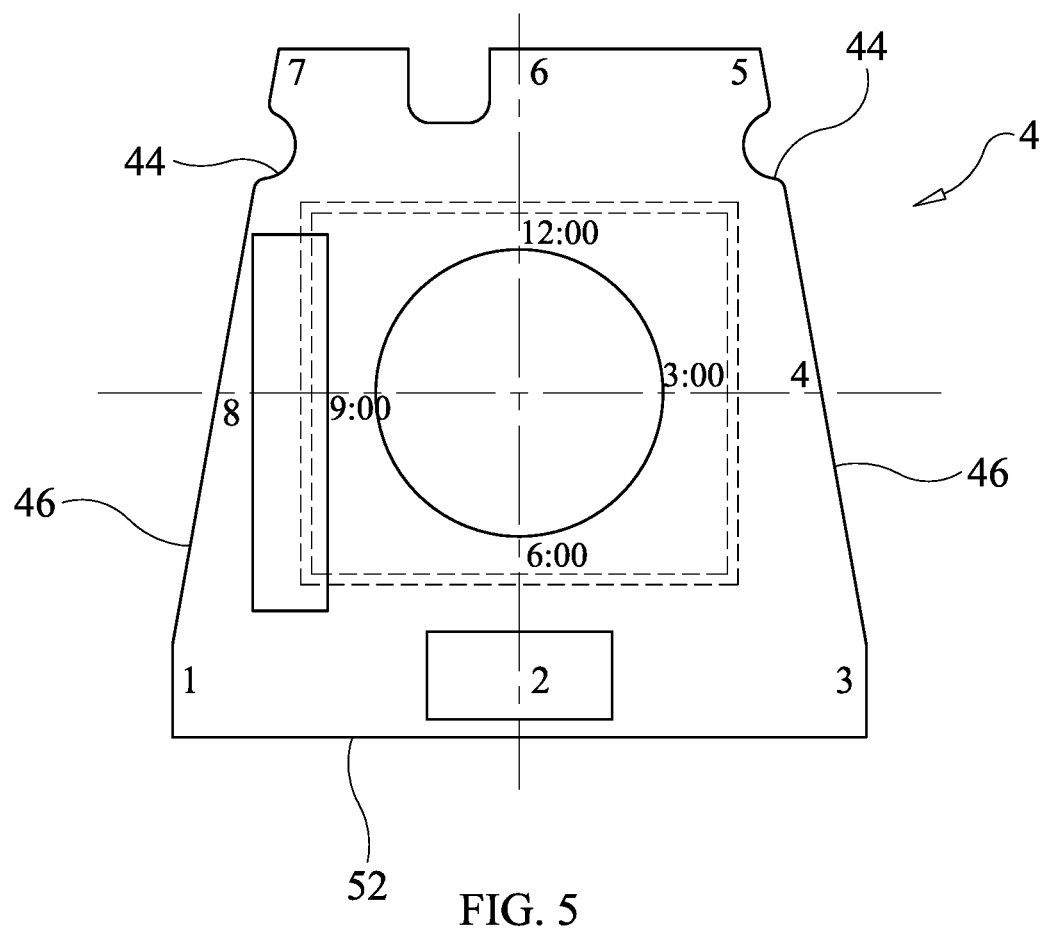
FIG. 5 is top plan view of a chemical reagent test slide mounted on the Z-axis measurement fixture, and illustrating preferred targets on the slide viewed by the optical measurement system in testing for Z-axis variability or surface irregularities in the slide.

More specifically, and with reference to FIG. 5 of the drawings, several spaced apart points on the top surface 54 of the planar object 2 are selected for viewing by the camera 32 of the optical measurement instrument 28. For example, in testing a trapezoidially-shaped chemical reagent test slide 4 for flatness, such as the test slide 4 shown in FIG. 5, preferably eight focus points are selected about the periphery of the slide 4. One point on the slide 4, for example, at Position "1" shown in FIG. 5, is designated as the focal point used to establish a zero reference plane. The camera 32 of the optical measurement instrument 28 then successively focuses on each of the other points on the top surface 54 of the slide 4, e.g., at Positions "2"-"8" shown in FIG. 5, but not necessarily in the numerical order which is shown, and the optical measurement instrument 28 measures the distance of the top surface 54 of the slide 4 at each focal point relative to the established zero reference plane at the selected starting point (e.g., at Position "1"). Some focal points on the slide 4 may reside in an X-Y plane above or below the zero reference plane. If no focal points are below the zero reference plane, then the degree of flatness of the slide 4 is determined as the highest measurement (i.e., the largest distance above the zero reference plane). Similarly, if no focal points are above the zero reference plane, then the degree of flatness of the slide 4 is determined as the lowest measurement (i.e., the largest distance below the zero reference plane). If one or more focal points are above the zero reference plane and one or more focal points are below the zero reference plane, then the absolute values of the highest measurement and the lowest measurement are added together in determining the degree of flatness of the slide 4.

It should be realized, of course, that in the method described above, the slide 4 or other object 2 may be mounted on the measurement fixture 6 before or after the measurement fixture 6 is placed on the gauge block 30 of the optical measurement instrument 28 and positioned under the viewing camera 32. Furthermore, use of the right angle form 36 is preferred to properly position the fixture 6 on the optical measurement instrument 28, but the form 36 in some instances may not be needed.

FIG. 5 illustrates preferred measurement targets (shown by the numbers 1-8) on the trapezoidially-shaped reagent test slide 4 supported by the fixture 6 of the present disclosure that are viewed optically by the camera 32 of the optical measurement system 28.

Figure 6A:
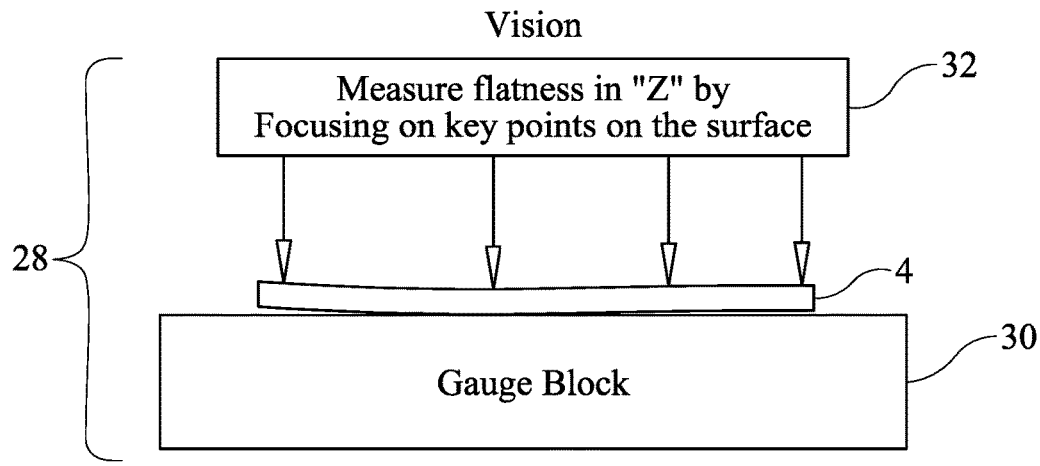
FIG. 6A is a side view of a chemical reagent test slide being optically tested for Z-axis variability in a conventional manner, that is, by placing the reagent test slide directly on the surface of a gauge block of an optical measurement system.
Figure 6B:
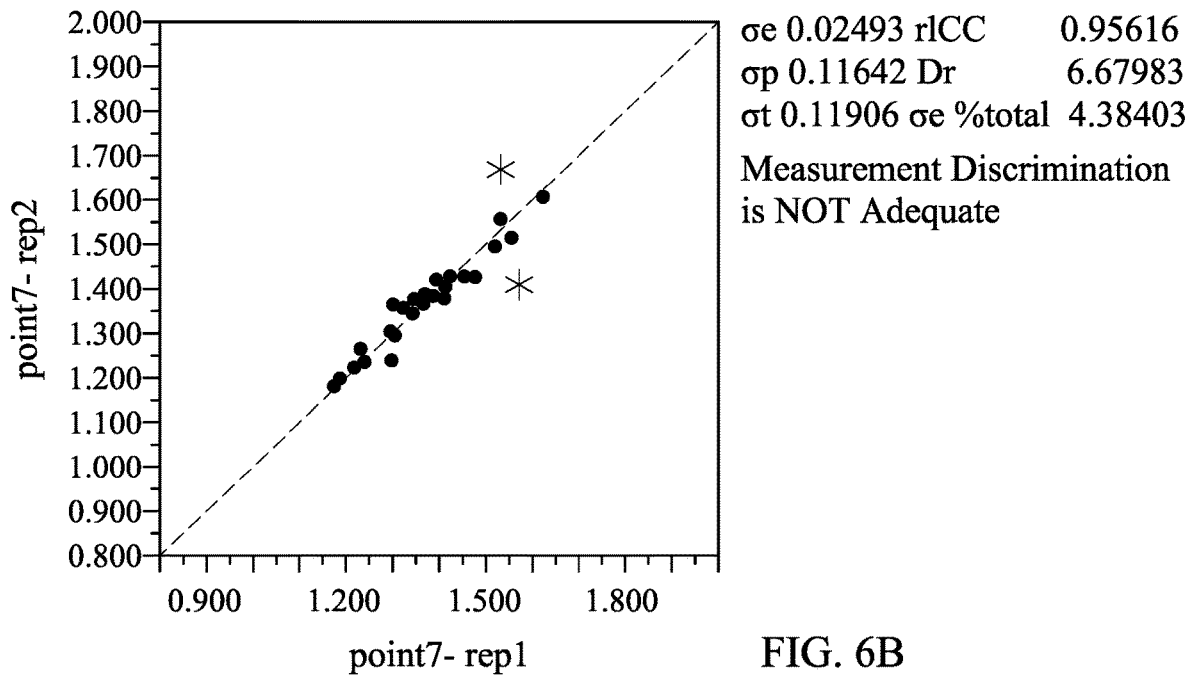
FIG. 6B is a graph illustrating optical measurements performed at a single point (Point 7—see FIG. 5) of a chemical reagent test slide placed directly on the gauge block of an optical measurement system in a conventional measurement technique such as shown in FIG. 6A.

FIGS. 6A and 6B illustrate the results of Z-axis variability measurements taken on a chemical reagent test slide 4 that rests directly on the gauge block 30 of an optical measurement system 28 in a conventional measurement method rather than being mounted on the Z-axis measurement fixture 6 of the present disclosure. As can be seen from FIG. 6B, there are some inaccuracies in the optical measurements at Point 7 on the slide 4 (see FIG. 5 for the location of this target point) when the chemical reagent test slide 4 rests directly on the gauge block 30 in such a conventionally-practiced method for checking for Z-axis variability.

Figure 7A:
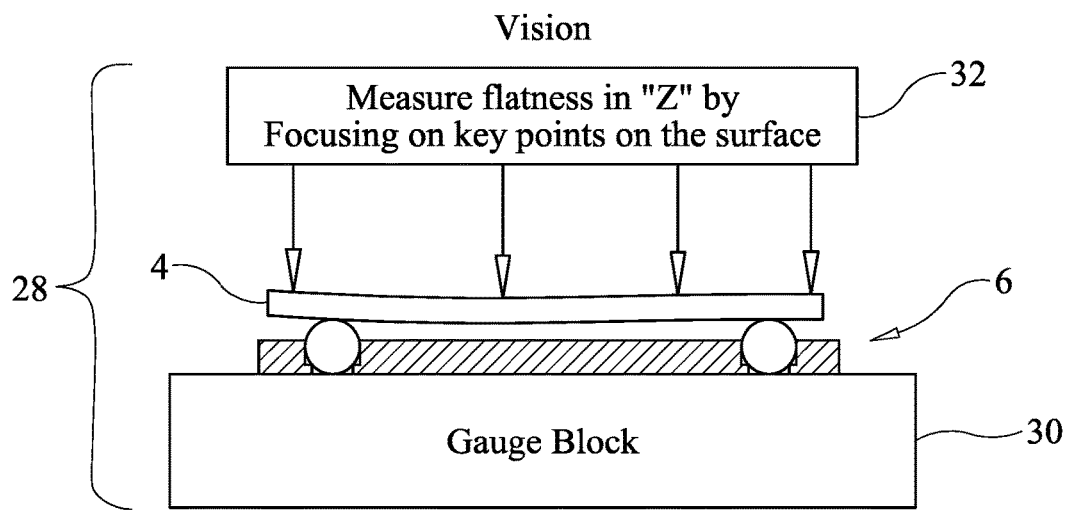
FIG. 7A is a side view of a chemical reagent test slide being mounted on a fixture formed in accordance with the present disclosure and optically tested for Z-axis variability in the slide, the fixture having the test slide mounted thereon being placed on the surface of a gauge block of an optical measurement system.
Figure 7B:
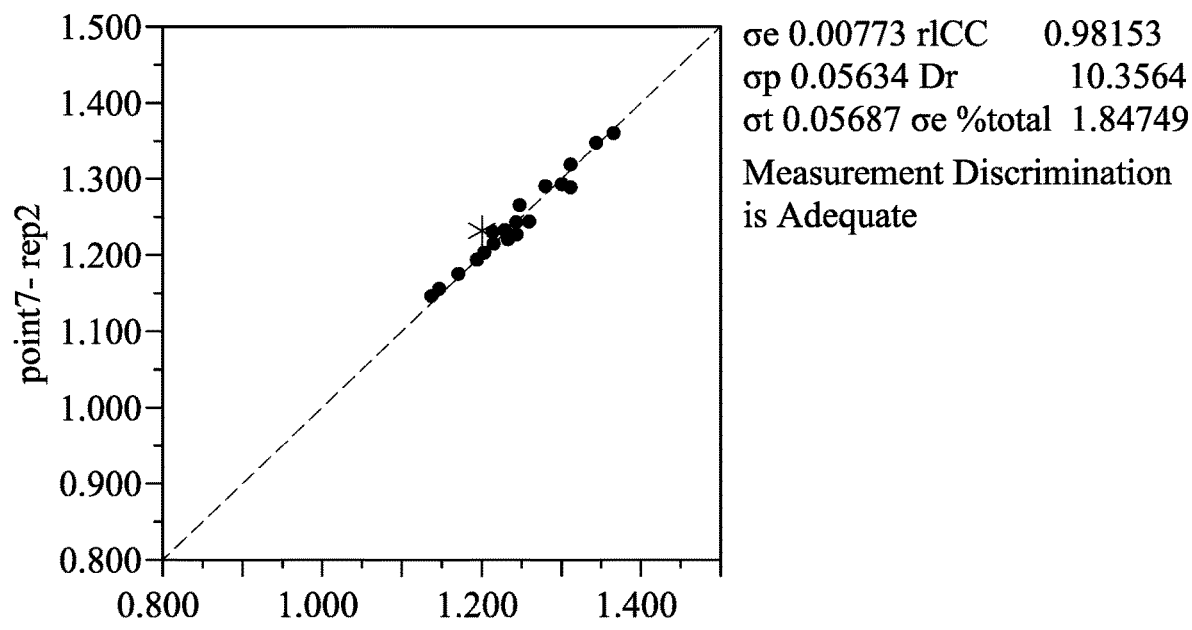
FIG. 7B is a graph illustrating optical measurements performed at a single point (Point 7—see FIG. 5) of a chemical reagent test slide mounted on the fixture of the present disclosure, the fixture having the test slide mounted thereon being placed on the gauge block of an optical measurement system such as shown in FIG. 7A.

However, reference should now be had to FIGS. 7A and 7B of the drawings, which show the chemical reagent test slide 4 being supported by the measurement fixture 6 of the present disclosure and, more specifically, resting on the object supporting members 10 (e.g., the stainless steel balls 18) of the measurement fixture 6, the supporting members 10 having a known and calibrated dimension in at least one coordinate direction (e.g., the diameters of the stainless steel balls 18). It should be noted that it is the object supporting members 10 (e.g., the calibrated balls 18) that support the planar object 2 above the surface 34 of the gauge block 30 by a precise distance that is unaffected by any irregularities in the planar main body 8 of the fixture 6 used in holding the object supporting members 10. As shown in FIG. 7B, a more accurate measurement of Z-axis variability at Point 7 on the chemical reagent test slide 4 (see FIG. 5 for the location of Target Point 7) is obtained.

As mentioned previously, the planar main body 8 of the Z-axis measurement fixture 6 of the present disclosure may be 3D printed and formed in many different shapes to accommodate and hold planar objects 2 of different shapes and sizes, including free form and irregularly-shaped objects 2. For example, and as shown in FIGS. 1, 1A and 2 of the drawings, the measurement fixture 6 used for testing trapezoidially-shaped chemical reagent test slides 4 may include one or more object edge guide projections 38 extending outwardly from the top wall 12 of the planar main body 8. As shown in FIGS. 1 and 2, there are two, generally V-shaped wedge projections 40 spaced apart from each other near opposite lateral sides 42 of the planar main body 8. These two wedge projections 40 are loosely received in notches 44 formed in opposite lateral side walls 46 of the trapezoidially-shaped chemical reagent test slide 4 to help hold the slide 4 in place and in a proper position above the top wall 12 of the planar main body 8. Furthermore, the fixture 6 may include a third projection 48 spaced apart from the pair of wedge projections 40 and situated at a lower edge portion 50 of the planar main body 8 of the fixture 6. This third projection 48 is formed as a straight ledge and engages the larger rear wall 52 of the trapezoidially-shaped chemical reagent test slide 4 so that the test slide 4 is held in place above the top wall 12 of the planar main body 8 of the fixture 6 between the two wedge projections 40 and the lower, third projection 48 such that the test slide 4 does not move relative to the fixture 6 in the X-Y plane.

The Z-axis measurement fixture 6 of the present disclosure holds the position of the stainless steel balls 18 in the X-Y plane, yet allows the balls 18 to freely contact the part 4 and the known flat surface 34 of the gauge block 30. The use of calibrated gauge balls 18 eliminates the need for tight tolerances on the spacer (i.e., the fixture 6 with its planar main body 8). This allows the part to be custom printed for the application. The gauge balls 18 provide a known calibrated "Z" distance from the known flat surface 34 of the gauge block 30. The calibrated gauge balls 18 further enable the part 4 (e.g., a chemical reagent test slide) to be positioned in space by consistently contacting three target datums on the part 4.

The fixture 6 and method for measuring the degree of Z-axis variability or surface topography irregularities in a chemical reagent test slide 4, or more generally, object 2, will now be further described.

In one embodiment, the Z-axis measurement fixture 6 used for testing whether a chemical reagent test slide 4 exhibits Z-axis variability or surface topography irregularities, includes a main body 8, the main body 8 having a top wall 12 and a bottom wall 14 disposed opposite the top wall 12, the main body 8 defining a plurality of member receiving openings 16 extending between the top wall 12 and the bottom wall 14; and a plurality of test slide supporting members 10, each test slide supporting member 10 of the plurality of test slide supporting members 10 having a known and calibrated dimension in at least one coordinate direction, each test slide supporting member 10 of the plurality of test slide supporting members 10 being received by a respective member receiving opening 16 of the plurality of member receiving openings 16 defined by the main body 8, each test slide supporting member 10 of the plurality of test slide supporting members 10 having a first portion 20 which projects outwardly from the top wall 12 of the main body 8 and a second portion 22 which projects outwardly from or is at least level with the bottom wall 14 of the main body 8, each test slide supporting member 10 of the plurality of test slide supporting members 10 being arranged within the respective member receiving opening 16 of the plurality of member receiving openings 16 such that the first portion 20 thereof projecting outwardly from the top wall 12 of the main body 8 and the second portion 22 thereof projecting outwardly from or being level with the bottom wall 14 of the main body 8 are in alignment with the known and calibrated dimension of the test slide supporting member 10 in the at least one coordinate direction.

In one embodiment of the fixture 6, each test slide supporting member 10 of the plurality of test slide supporting members 10 is a spherical member having a known and calibrated diameter.

In one embodiment of the fixture 6, each test slide supporting member 10 of the plurality of test slide supporting members 10 is a stainless steel ball 18 having a known and calibrated diameter.

In one embodiment of the fixture 6, the plurality of test slide supporting members 10 includes three test slide supporting members 10 spaced apart from each other.

In one embodiment of the Z-axis measurement fixture 6, the first portion 20 of each test slide supporting member 10 of the plurality of test slide supporting members 10 which projects outwardly from the top wall 12 of the main body 8 is adapted to contact and support a portion of the chemical reagent test slide 4. In one embodiment of the fixture 6, the second portion 22 of each test slide supporting member 10 of the plurality of test slide supporting members 10 which projects outwardly from or is level with the bottom wall 14 of the main body 8 is adapted to contact a surface 34 of a gauge block 30 of a measurement instrument 28.

In one embodiment of the Z-axis measurement fixture 6, the main body 8 includes at least one test slide edge guide projection 38 extending outwardly from the top wall 12 thereof, the at least one test slide edge guide projection 38 being provided to help locate the chemical reagent test slide 4 in a proper position above the top wall 12 of the main body 8.

In one embodiment of the Z-axis measurement fixture 6, the at least one test slide edge guide projection 38 includes a first generally V-shaped wedge projection 40 and a second generally V-shaped wedge projection 40, the first wedge projection 40 being spaced apart from the second wedge projection 40 on the top wall 12 of the main body 8, the chemical reagent test slide 4 being receivable between the first and second wedge projections 40.

In one embodiment of the Z-axis measurement fixture 6, the at least one test slide edge guide projection 38 includes a first generally V-shaped wedge projection 40, a second generally V-shaped wedge projection 40 and a third projection 48, the first wedge projection 40 being spaced apart from the second wedge projection 40 on the top wall 12 of the main body 8, the third projection 48 being spaced apart from the first wedge projection 40 and the second wedge projection 40 on the top wall 12 of the main body 8, the chemical reagent test slide 4 being receivable between the first and second wedge projections 40 and the third projection 48.

Described herein is a method of measuring the degree of Z-axis variability or surface topography irregularities in a chemical reagent test slide 4. The chemical reagent test slide 4 has an upper surface 54 and a lower surface 56 situated opposite the upper surface 54. The method includes the step of placing a Z-axis measurement fixture 6 on a surface 34 of a gauge block 30 of a measurement instrument 28, the Z-axis measurement fixture 6 having a main body 8 and a plurality of test slide supporting members 10, the main body 8 having a top wall 12 and a bottom wall 14 disposed opposite the top wall 12, the main body 8 defining a plurality of member receiving openings 16 extending between the top wall 12 and the bottom wall 14, each test slide supporting member 10 of the plurality of test slide supporting members 10 having a known and calibrated dimension in at least one coordinate direction, each test slide supporting member 10 of the plurality of test slide supporting members 10 being received by a respective member receiving opening 16 of the plurality of member receiving openings 16 extending in the main body 8, each test slide supporting member 10 of the plurality of test slide supporting members 10 having a first portion 20 which projects outwardly from the top wall 12 of the main body 8 and a second portion 22 which projects outwardly from or is at least level with the bottom wall 14 of the main body 8, each test slide supporting member 10 of the plurality of the test slide supporting members 10 being arranged within the respective member receiving opening 16 of the plurality of member receiving openings 16 such that the first portion 20 thereof projecting outwardly from the top wall 12 of the main body 8 and the second portion 22 thereof projecting outwardly from or being level with the bottom wall 14 of the main body 8 are in alignment with the known and calibrated dimension of the test slide supporting member 10 in the at least one coordinate direction, wherein the second portion 22 of each test slide supporting member 10 of the plurality of test slide supporting members 10 engages the surface 34 of the gauge block 30 of the measurement instrument 28.

In one embodiment, the method includes the step of mounting the chemical reagent test slide 4 on the Z-axis measurement fixture 6 such that the chemical reagent test slide 4 rests on and is supported by the first portion 20 of each test slide supporting member 10 of the plurality of test slide supporting members 10.

In one embodiment, the method includes the step of positioning the chemical reagent test slide 4 mounted on the Z-axis measurement fixture 6 on the measurement instrument 28.

In one embodiment, the method includes the step of determining by the measurement instrument 28 the degree of Z-axis variability or surface topography irregularities in the chemical reagent test slide 4.

In one embodiment, a method of measuring the degree of Z-axis variability or surface topography irregularities in a chemical reagent test slide 4 is described herein. The chemical reagent test slide 4 has an upper surface 54 and a lower surface 56 situated opposite the upper surface 54. The method includes the step of placing a Z-axis measurement fixture 6 on a surface 34 of a gauge block 30 of an optical measurement instrument 28, the Z-axis measurement fixture 6 having a main body 8 and a plurality of test slide supporting members 10, the main body 8 having a top wall 12 and a bottom wall 14 disposed opposite the top wall 12, the main body 8 defining a plurality of member receiving openings 16 extending between the top wall 12 and the bottom wall 14, each test slide supporting member 10 of the plurality of test slide supporting members 10 having a known and calibrated dimension in at least one coordinate direction, each test slide supporting member 10 of the plurality of test slide supporting members 10 being received by a respective member receiving opening 16 of the plurality of member receiving openings 16 extending in the main body 8, each test slide supporting member 10 of the plurality of test slide supporting members 10 having a first portion 20 which projects outwardly from the top wall 12 of the main body 8 and a second portion 22 which projects outwardly from or is at least level with the bottom wall 14 of the main body 8, each test slide supporting member 10 of the plurality of the test slide supporting members 10 being arranged within the respective member receiving opening 16 of the plurality of member receiving openings 16 such that the first portion 20 thereof projecting outwardly from the top wall 12 of the main body 8 and the second portion 22 thereof projecting outwardly from or being level with the bottom wall 14 of the main body 8 are in alignment with the known and calibrated dimension of the test slide supporting member 10 in the at least one coordinate direction, wherein the second portion 22 of each test slide supporting member 10 of the plurality of test slide supporting members 10 engages the surface 34 of the gauge block 30 of the optical measurement instrument 28, the optical measurement instrument 28 further having a camera 32.

In one embodiment, the method includes the step of mounting the chemical reagent test slide 4 on the Z-axis measurement fixture 6 such that the chemical reagent test slide 4 rests on and is supported by the first portion 20 of each test slide supporting member 10 of the plurality of test slide supporting members 10.

In one embodiment, the method includes the step of positioning the chemical reagent test slide 4 mounted on the Z-axis measurement fixture 6 in optical communication with the camera 32 of the optical measurement instrument 28.

In one embodiment, the method includes the step of imaging the chemical reagent test slide 4 using the camera 32 of the optical measurement instrument 28 having a predetermined field of view at a first focal point or first focal area on an imaged surface of the chemical reagent test slide 4 to provide a first optical image of the chemical reagent test slide 4 in which the first focal point or first focal area on the imaged surface of the chemical reagent test slide 4 is in focus in the first optical image, the first optical image being in a first X-Y plane in which the first focal point or first focal area, in focus in the first optical image, resides, the first X-Y plane establishing a zero reference plane for measuring the degree of Z-axis variability or surface topography irregularities in the chemical reagent test slide 4.

In one embodiment, the method includes the step of imaging the chemical reagent test slide 4 using the camera 32 of the optical measurement instrument 28 at at least a second focal point or second focal area on the imaged surface of the chemical reagent test slide 4 which is spaced from the first focal point or first focal area to provide at least a second optical image of the chemical reagent test slide 4 in which the at least second focal point or second focal area is in focus in the at least second optical image, the at least second optical image being in an at least second X-Y plane in which the at least second focal point or second focal area, in focus in the at least second optical image, resides.

In one embodiment, the method includes the step of measuring the relative distance in the Z-axis between the zero reference plane and the at least second X-Y plane to provide a measured relative distance.

In one embodiment, the method includes the step of determining from the measured relative distance the degree of Z-axis variability or surface topography irregularities in the chemical reagent test slide 4.

In one embodiment, a method of measuring the degree of Z-axis variability or surface topography irregularities in an object 2 to be tested is described herein. The object 2 to be tested has an upper surface 54 and a lower surface 56 situated opposite the upper surface 54. The method includes the step of placing a Z-axis measurement fixture 6 on a surface 34 of a gauge block 30 of an optical measurement instrument 28, the Z-axis measurement fixture 6 having a main body 8 and a plurality of object supporting members 10, the main body 8 having a top wall 12 and a bottom wall 14 disposed opposite the top wall 12, the main body 8 defining a plurality of member receiving openings 16 extending between the top wall 12 and the bottom wall 14, each object supporting member 10 of the plurality of object supporting members 10 having a known and calibrated dimension in at least one coordinate direction, each object supporting member 10 of the plurality of object supporting members 10 being received by a respective member receiving opening 16 of the plurality of member receiving openings 16 extending in the main body 8, each object supporting member 10 of the plurality of object supporting members 10 having a first portion 20 which projects outwardly from the top wall 12 of the main body 8 and a second portion 22 which projects outwardly from or is at least level with the bottom wall 14 of the main body 8, each object supporting member 10 of the plurality of object supporting members 10 being arranged within the respective member receiving opening 16 of the plurality of member receiving openings 16 such that the first portion 20 thereof projecting outwardly from the top wall 12 of the main body 8 and the second portion 22 thereof projecting outwardly from or being level with the bottom wall 14 of the main body 8 are in alignment with the known and calibrated dimension of the object supporting member 10 in the at least one coordinate direction, wherein the second portion 22 of each object supporting member 10 of the plurality of the object supporting members 10 engages the surface 34 of the gauge block 30 of the optical measurement instrument 28, the optical measurement instrument 28 further having a camera 32.

In one embodiment, the method includes the step of mounting the object 2 to be tested on the Z-axis measurement fixture 6 such that the object 2 to be tested rests on and is supported by the first portion 20 of each object supporting member 10 of the plurality of object supporting members 10.

In one embodiment, the method includes the step of positioning the object 2 to be tested mounted on the Z-axis measurement fixture 6 in optical communication with the camera 32 of the optical measurement instrument 28.

In one embodiment, the method includes the step of imaging the object 2 to be tested using the camera 32 of the optical measurement instrument 28 having a predetermined field of view at a first focal point or first focal area on an imaged surface of the object 2 to be tested to provide a first optical image of the object 2 in which the first focal point or first focal area on the imaged surface of the object 2 is in focus in the first optical image, the first optical image being in a first X-Y plane in which the first focal point or first focal area, in focus in the first optical image, resides, the first X-Y plane establishing a zero reference plane for measuring the degree of Z-axis variability or surface topography irregularities in the object 2.

In one embodiment, the method includes the step of successively imaging the object 2 to be tested using the camera 32 of the optical measurement instrument 28 at successive spaced apart focal points or focal areas on the imaged surface of the object 2 to provide successive optical images of the object 2 in which the successive focal points or focal areas are respectively in focus, the successive optical images being in optical X-Y planes in which the respective focal points or focal areas reside and are in focus.

In one embodiment, the method includes the step of determining whether one or more of the optical X-Y planes are above the zero reference plane relative to the Z-axis and whether one or more of the optical X-Y planes is below the zero reference plane relative to the Z-axis.

In one embodiment, the method includes the step of measuring the relative distances in the Z-axis between the zero reference plane and each successive optical X-Y plane to provide a plurality of measured relative distances.

In one embodiment of the method, when all of the successive optical X-Y planes are situated above the zero reference plane, the method includes the steps of determining which of the measured relative distances is the greatest relative distance above the zero reference plane and determining the degree of Z-axis variability or surface topography irregularities in the object 2 from the greatest relative distance above the zero reference plane.

In one embodiment of the method, when all of the successive optical X-Y planes are situated below the zero reference plane, the method includes the steps of determining which of the measured relative distances is the greatest relative distance below the zero reference plane and determining the degree of Z-axis variability or surface topography irregularities in the object 2 from the greatest relative distance below the zero reference plane.

In one embodiment of the method, when one or more of the successive optical X-Y planes are situated above the zero reference plane and one or more of the successive optical X-Y planes are situated below the zero reference plane, the method includes the steps of determining which of the measured relative distances for the successive optical X-Y planes above the zero reference plane is the greatest measured distance above the zero reference plane and determining which of the measured relative distances for the successive optical X-Y planes below the zero reference plane is the greatest measured distance below the zero reference plane and determining the degree of Z-axis variability or surface topography irregularities in the object 2 from the greatest measured distance above the zero reference plane and the greatest measured distance below the zero reference plane.

In one embodiment of the method, each object supporting member 10 of the plurality of object supporting members 10 of the Z-axis measurement fixture 6 is a spherical member having a known and calibrated diameter.

In one embodiment of the method, each object supporting member 10 of the plurality of object supporting members 10 of the Z-axis measurement fixture 6 is a stainless steel ball 18 having a known and calibrated diameter.

In one embodiment of the method, the plurality of object supporting members 10 of the Z-axis measurement fixture 6 includes three object supporting members 10 spaced apart from each other.

In one embodiment of the method, the main body 8 of the Z-axis measurement fixture 6 includes at least one object edge guide projection 38 extending outwardly from the top wall 12 thereof, the at least one object edge guide projection 38 being provided to help locate the object 2 to be tested in a proper position above the top wall 12 of the main body 8.

In one embodiment of the method, the at least one object edge guide projection 38 of the fixture 6 includes a first generally V-shaped wedge projection 40 and a second generally V-shaped wedge projection 40, the first wedge projection 40 being spaced apart from the second wedge projection 40 on the top wall 12 of the main body 8 of the fixture 6, wherein the object 2 to be tested is receivable between the first and second wedge projections 40.

In one embodiment of the method, the at least one object edge guide projection 38 of the fixture 6 includes a first generally V-shaped wedge projection 40, a second generally V-shaped wedge projection 40 and a third projection 48, the first wedge projection 40 being spaced apart from the second wedge projection 40 on the top wall 12 of the main body 8 of the fixture 6, the third projection 48 being spaced apart from the first wedge projection 40 and the second wedge projection 40 on the top wall 12 of the main body 8, wherein the object 2 to be tested is receivable between the first and second wedge projections 40 and the third projection 48.

Although illustrative embodiments of the present disclosure have been described herein with reference to the accompanying drawings, it is to be understood that the disclosure is not limited to those precise embodiments, and that various other changes and modifications may be effected therein by one skilled in the art without departing from the scope or spirit of the disclosure.

What is claimed is:

1. A Z-axis measurement fixture used for testing whether a chemical reagent test slide exhibits Z-axis variability or surface topography irregularities, which comprises:
   a main body, the main body having a top wall and a bottom wall disposed opposite the top wall, the main body defining a plurality of member receiving openings extending between the top wall and the bottom wall; and
   a plurality of test slide supporting members, each test slide supporting member of the plurality of test slide supporting members having a known and calibrated dimension in at least one coordinate direction, each test slide supporting member of the plurality of test slide supporting members being received by a respective member receiving opening of the plurality of member receiving openings defined by the main body, each test slide supporting member of the plurality of test slide supporting members having a first portion which projects outwardly from the top wall of the main body and a second portion which projects outwardly from or is at least level with the bottom wall of the main body, each test slide supporting member of the plurality of test slide supporting members being arranged within the respective member receiving opening of the plurality of member receiving openings such that the first portion thereof projecting outwardly from the top wall of the main body and the second portion thereof projecting outwardly from or being level with the bottom wall of the main body are in alignment with the known and calibrated dimension of the test slide supporting member in the at least one coordinate direction.

2. A Z-axis measurement fixture as defined by claim 1, wherein each test slide supporting member of the plurality of test slide supporting members is a spherical member having a known and calibrated diameter.

3. A Z-axis measurement fixture as defined by claim 1, wherein each test slide supporting member of the plurality of test slide supporting members is a stainless steel ball having a known and calibrated diameter.

4. A Z-axis measurement fixture as defined by claim 1, wherein the plurality of test slide supporting members includes three test slide supporting members spaced apart from each other.

5. A Z-axis measurement fixture as defined by claim 1, wherein the first portion of each test slide supporting member of the plurality of test slide supporting members which projects outwardly from the top wall of the main body is adapted to contact and support a portion of the chemical reagent test slide; and
   wherein the second portion of each test slide supporting member of the plurality of test slide supporting members which projects outwardly from or is level with the bottom wall of the main body is adapted to contact a surface of a gauge block of a measurement instrument.

6. A Z-axis measurement fixture as defined by claim 1, wherein the main body includes at least one test slide edge guide projection extending outwardly from the top wall thereof, the at least one test slide edge guide projection being provided to help locate the chemical reagent test slide in a proper position above the top wall of the main body.

7. A Z-axis measurement fixture as defined by claim 6, wherein the at least one test slide edge guide projection includes a first generally V-shaped wedge projection and a second generally V-shaped wedge projection, the first wedge projection being spaced apart from the second wedge projection on the top wall of the main body; and
   wherein the chemical reagent test slide is receivable between the first and second wedge projections.

8. A Z-axis measurement fixture as defined by claim 6, wherein the at least one test slide edge guide projection includes a first generally V-shaped wedge projection, a second generally V-shaped wedge projection and a third projection, the first wedge projection being spaced apart from the second wedge projection on the top wall of the main body, the third projection being spaced apart from the first wedge projection and the second wedge projection on the top wall of the main body; and
   wherein the chemical reagent test slide is receivable between the first and second wedge projections and the third projection.

9. A Z-axis measurement fixture as defined by claim 1, wherein the main body holds the test slide supporting members captive within their respective member receiving openings in an immobile state.

10. A Z-axis measurement fixture as defined by claim 1, wherein the main body holds the test slide supporting members captive within their respective member receiving openings in a mobile state.

11. A Z-axis measurement fixture as defined by claim 1, wherein the test slide supporting members are movable within their respective member receiving openings in a transverse direction in the main body.

12. A Z-axis measurement fixture as defined by claim 1, wherein the test slide supporting members are movable within their respective member receiving openings in a transverse direction in the main body between the top wall and the bottom wall thereof.

13. A Z-axis measurement fixture as defined by claim 1, wherein the test slide supporting members are removable from their respective member receiving openings.

14. A Z-axis measurement fixture as defined by claim 1, wherein the test slide supporting members are removable from their respective member receiving openings from either the top wall or the bottom wall of the main body.

15. A Z-axis measurement fixture as defined by claim 1, wherein the test slide supporting members float within their respective member receiving openings and are not constrained in movement in a transverse direction by the main body.

16. A Z-axis measurement fixture as defined by claim 1, wherein the member receiving openings are generally cylindrical in shape.

17. A Z-axis measurement fixture as defined by claim 16, wherein the member receiving openings have a relatively larger diameter upper portion situated in proximity to the top wall of the main body and extending into the thickness of the main body, and a smaller diameter lower portion, relative to the diameter of the upper portion, situated in proximity to the bottom wall of the main body and extending into the thickness of the main body.

18. A Z-axis measurement fixture as defined by claim 17, wherein the diameters of the upper portions of the member receiving openings are greater than the lateral width or diameter of the test slide supporting members such that the test slide supporting members are receivable by and are movable in the upper portions of respective member receiving openings, and wherein the diameters of the lower portions of the member receiving openings are chosen so that the second portions of the test slide supporting members project outwardly from or are at least level with the bottom wall of the main body.

* * * * *